June 29, 1948.　　　　　F. JACOBS　　　　　2,444,046
COUPLING TERMINAL UNIT FOR STORAGE BATTERIES
Filed June 5, 1945
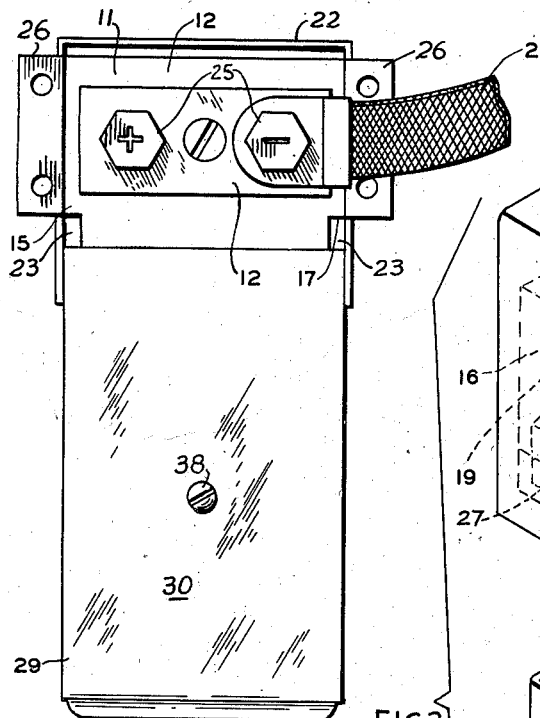
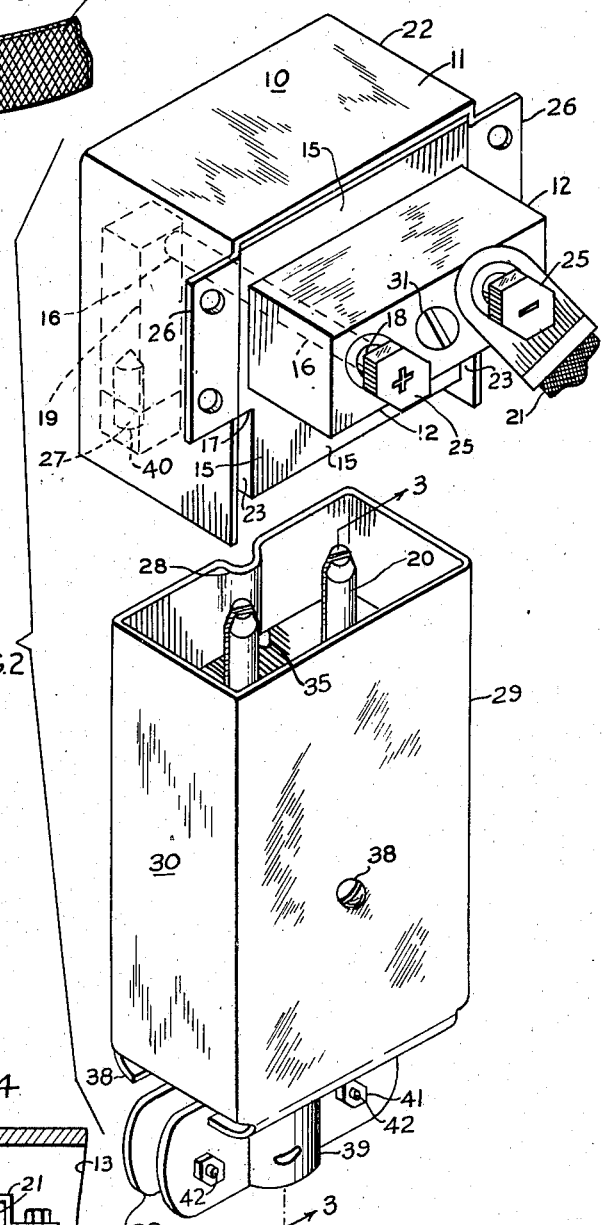
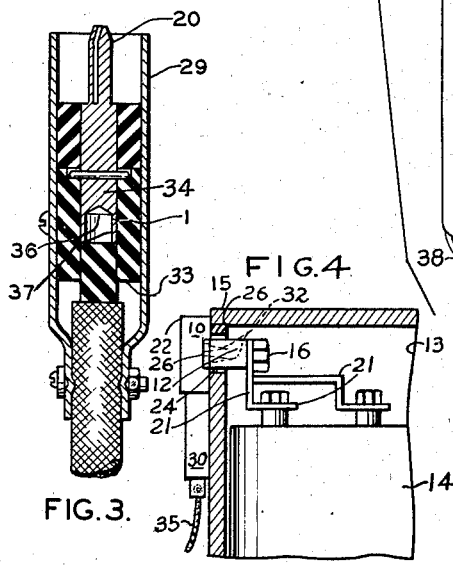
INVENTOR.
FRANK JACOBS
BY
William D. Hull,
ATTORNEY Patented June 29, 1948

2,444,046

UNITED STATES PATENT OFFICE 2,444,046

COUPLING TERMINAL UNIT FOR STORAGE BATTERIES

Frank Jacobs, Asbury Park, N. J.

Application June 5, 1945, Serial No. 597,685

2 Claims. (Cl. 173—328)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to electrical equipment, and more particularly, to a coupling terminal unit for storage batteries.

It is an object of the present invention to provide a new and improved coupling terminal unit for storage batteries that will avoid one or more of the disadvantages and limitations of coupling terminal units, previously developed in the prior art.

An additional object of this invention is to provide a new and improved coupling terminal unit for storage batteries that can be set flat and relatively inconspicuously, against the side of the box holding the storage battery.

A further object of the present invention is to provide a new and improved coupling terminal unit for storage batteries that will eliminate the necessity of disconnecting the leads specifically on the storage battery, when connection and disconnection to the storage battery to an outside network or for charging, is required.

For a better understanding of the present invention, together with other and further objects thereof, reference is had to the following description taken in connection with the accompanying drawings, and its scope will be pointed out in the appended claims.

Referring to the drawing:

Figure 1 is a rear view of a coupling terminal unit for storage batteries, embodying this invention, the socket and plug sections of the unit not being completely closed;

Figure 2 is a perspective view of the device shown in Fig. 1, with the socket and plug sections separated;

Figure 3 is a longitudinal sectional view on a smaller scale through the plug section of the electrical coupling unit along the line 3—3 of Fig. 2; and Figure 4 is a composite view of the electrical coupling unit connected with an enclosing box and storage battery to be serviced. The view is taken with portions broken away, to indicate the manner of connecting the unit to the battery and mounting it on its box or container.

Similar reference characteristics refer to similar parts throughout the drawing.

In this particular illustration of the invention, there are two main parts, termed the socket section respectively and the plug section, both being adapted for removable attachment to each other.

*Socket section*

The socket section 10 consists of an L-shaped rubber insulation member 11 with two L-shaped electrodes 16 embedded in it, and a rectangular hollow housing 22 of metal arranged to enclose the member overall except the sides, arbitrarily designated as rear and bottom.

The insulating member 11 projects out laterally at right angles at the rear to form a terminal block 12. This block 12 is rectangular in contour and is located nearer the top of the member 11 than to its bottom. It is restricted in length and height to provide a flat area 15 around it, on the surface of the member 11 from which it projects. The width of the block is equal to or larger than the thickness of the wall of a battery box 13, to which the socket section 10 is to be rigidly attached.

The electrodes 16 are embedded in the member and are also L-shaped to conform with the contour of the member 11. An integral terminal leg 18 forming one end portion of each electrode 16 extends laterally beyond the terminal block 12 and is screw-threaded to adjustably hold a nut 25 which is employed to secure a copper battery connecting strap 21 thereto. The opposite end of each electrode forms a leg 19 and has a socket 27 therein. It follows the general contour of the member 11, and is at right angles to the terminal leg 18. It terminates adjacent to the bottom face of the member 11 with its socket accessible to the prongs 20 to be inserted therein.

Each leg 19 has its socket 27 arranged to receive its respective prong 20, to be referred to later. The member 11 is also undercut all around to provide a ledge 17 as shown in the drawings. A bolt 31 with countersunk head passes through the member 11 to rigidly secure it in a metal housing or casing 22 in which it is inserted and enclosed.

The housing 22 is rectangular and has four walls. These walls are respectively termed the top, front, and two sides. The sides are extended laterally at right angles to provide flanges 26. These flanges 26 have holes for the use of screws to hold the socket section 10 to the exterior of a battery box 13 in which the battery 14 to be connected, is in. These flanges 26 are in general alignment with the terminal block 12, so that when the latter is pushed through a rectangular hole 24 in the box 13, the face 15 of the member will come flat against the box 13. The supporting screws 32 in these flanges will be on either side of it, in the box wall. These screws 32 secure the socket section to the battery box, as indicated.

The housing 22 is so placed on the member that narrow spaces 23 are provided between its sides and the front and side walls of the housing 22 under the ledges 17. The front of the housing 22 is provided with an aligning corrugation which registers with a groove (not shown) in the member 10. It is also screw-threaded to hold the bolt 31, which secures the member 11 rigidly in it. The housing 22 serves to enclose and protect the insulating member 11, and frictionally hold a plug section 30 to it.

Plug section

The plug section 30 differs from the socket section 10 in that it plugs into the socket section. For this purpose it has prongs 20 extending from the upper ends of two straight electrodes 34 embedded in a straight rectangular insulation member 33. This member 33 is preferably made in two parts to facilitate the insertion and pin securing of these electrodes 34, and then cemented together. It has a corrugation groove 35 at the middle for the whole length of its front, and a screw threaded hole provided for the bolt 38 fastening, a metal housing 29 over it. The prongs 20 are split lengthwise and formed to slip readily into the sockets 27. The lower portion of each electrode 34 is counterbored to provide a lug hole 37 for the soldering-in of its respective conductor 36. Each electrode 34 terminates in a recess 41 and is spaced back from the bottom face of the member 33, so as to avoid its being exposed to external contact. The recess 41 is sufficient in size to enclose a portion of the rubber insulation of the conductor.

The metal housing 29 walls in the member 33 on its four sides, the upper end being left open to expose the prongs 20 and position the member 33 so its upper face will be spaced back, as shown in Fig. 3. The lower portion of the housing 29 is open but restricted by the formation of a two-flanged clamp 39 designed to clamp on to the conductor cable, containing the conductors 36 and hold it as its bolts 42 are screwed tightly on. An aligning corrugation 28 is provided in the front wall of the housing so as to register with the corrugation (not shown) on the socket housing 22. The groove 35 is provided in the member 33 for the corrugation 28 to fit into during assembly.

Method of use

The socket section 10 is fastened by screws through the flanges 26 to the outside surface of the battery box 13, with the block 12, projecting through and fitting the hole 24, and coming out at the opposite face of the box, where its terminal legs 18 can be connected to the battery binding posts, through the use of the connecting straps 21.

The process of inserting the lower plug section 30 into the upper socket section 10, will make the details of their structure more apparent. The metal housing 29 of the plug section 30 is pushed into the metal housing 22 of the socket section 10, until the prongs 20 are inserted fully into the sockets 27 in the legs 19. At the same time, the walls of housing 29 enter the spaces 23 between the walls of housing 22 until their upper edges or rims abut the ledges 17 and stop. The frictional contact between the walls of both section 10 and 20 as well as that of the prongs 20 in the sockets 27 holds the sections securely together. The plug section 30 however may be withdrawn downwardly at any time for removal by exerting a little force, while the socket section 10 is fastened to the box, and stays there.

The general use of the unit, when coupled together and with a storage battery on an automobile, is for charging the latter from an extraneous electric service. However, the cable on the plug section can run to the electrical parts of the automobile and serve same. The plug section for the automobile can thus be detached quickly and conveniently at any time, and be replaced with a similar plug section cable connected with a charger. The vertical arrangement of plugging-in on the side of the box 13 keeps it close thereto and out of the way. The depressed portions on the casings assures proper alignment and prevent the connections from being of the wrong polarity, with the possibility of causing incidental damage due thereto. The permanent attachment of the leads 21 to the terminals of the battery 14 saves considerable time, and labor of an inconvenient kind. The connecting and disconnecting of storage batteries on a vehicle is always an objectionable performance, but is avoided in this invention. The unit couples together substantially, by reason of the resilient and frictional hold obtained by the pressure of the shell of the casings on one another where they contact each other. Also added to which are the depressed or corrugated portions, and that of the split or spreaded prongs 20 in the socket 19. The clamp 39 keeps the cable held securely and prevents vibration from loosening the conductors 36 in the lugs 37. The enclosing structure of the casings keeps the conducting parts clean and protects them from being injured or causing injury.

While there has been described what is at present considered to be a preferred embodiment of this invention, it will be obvious to those skilled in the art that various changes and modifications may be made therein without departing from the invention or the principles thereof. It is therefore aimed in the appended claims to cover all such changes and modifications as fall within the true spirit and scope of the invention.

What is claimed is:

1. A coupling terminal unit for electrically connecting a storage battery in a container to an outside network comprising in combination, a socket section including a rectangular walled housing, an insulating member fastened in the housing having an integral terminal block extending beyond the housing substantially at right angles thereto and beyond the housing, and electrodes in the member conforming with the contour thereof, each electrode having a terminal leg with a connection extending through and from the block and arranged for connection to said battery and having a socket leg integral therewith terminating in a portion of the member within the housing at right angles to said terminal leg, a removable plug section arranged for coordinative coupling with the socket section, said plug section including a rectangular walled housing open at one end and partly closed at the opposite end, an insulating member within said last mentioned housing and terminating with its end surfaces spaced from said open and partly closed ends of the housing, straight electrodes secured within said member with individual prongs projecting from one end of said member encompassed but not touched by the walls of the open portion of said housing so as to be exposed therein, the encompassing walls of said plug housing being of slightly less size than the walls of the socket section so as to slidably fit therein, the end portions of said straight electrodes opposite to those of the prongs being lug-like to permit the insertion and connection of conductors therein, and clamps on the housing for holding said conductors rigidly therein, said socket section being rigidly attachable to said container with its terminal block and electrodes extending through the wall thereof so as to be adjacent to the binding posts of said battery for connection thereto.

2. A coupling terminal unit for electrically connecting a storage battery in a containing box to a network external thereto comprising in combination, a socket section including a hollow rectangular walled housing, an insulating member fitted and fastened in the housing having a laterally extending terminal block attached thereto and extending through an opening in and beyond the housing substantially at right angles thereto in L-shaped form, and L-shaped electrodes embedded in the members conforming with the contour thereof and having terminal legs and socket legs arranged thereon, said terminal legs extending through and from the block and said socket legs being in the member and terminating adjacent a face of the member and within the housing, a plug section arranged for coordinative coupling with said socket section, said plug section including a hollow rectangular walled housing open at one end and partly closed at the opposite end, a straight rectangular insulating member disposed within the walls and shorter than said last mentioned housing and terminating with its end surfaces spaced from said ends of the housing, straight electrodes held within said member with split parallel prongs projecting from one end of said member centrally encompassed and spaced away from the walls of said open portion of said housing, this encompassing portion of said plug housing being of a form to joinably attach to said walls of the socket section so as to slidably fit thereon, portions of the second mentioned electrodes at the end opposite to the prongs having lug-like recesses therein to permit the insertion and connection of conductors therein and part of the insulation thereon, clamps on the housing for holding the conductors rigidly therein and in said straight member, said terminal block being arranged to pass through an opening in the wall of said box adjacent to said battery therein to bring said terminal legs in proximate relation to the binding posts of the battery for connection therewith, and means for coupling the terminal legs with said binding posts.

FRANK JACOBS.

REFERENCES CITED

The following references are of record in the file of this patent:

UNITED STATES PATENTS

| Number | Name | Date |
| --- | --- | --- |
| 762,684 | Case | June 14, 1904 |
| 1,651,489 | Voigt | Dec. 6, 1927 |
| 1,722,816 | Meunier | July 30, 1929 |
| 2,089,844 | Anderson | Aug. 10, 1937 |
| 2,136,848 | Hassler | Nov. 15, 1938 |
| 2,234,820 | Douglas | Mar. 11, 1941 |
| 2,299,206 | Berg | Oct. 20, 1942 |
| 2,379,189 | Rupp | June 26, 1945 |